(No Model.)
G. C. MORGAN.
BOILER.
No. 280,392. Patented July 3, 1883.
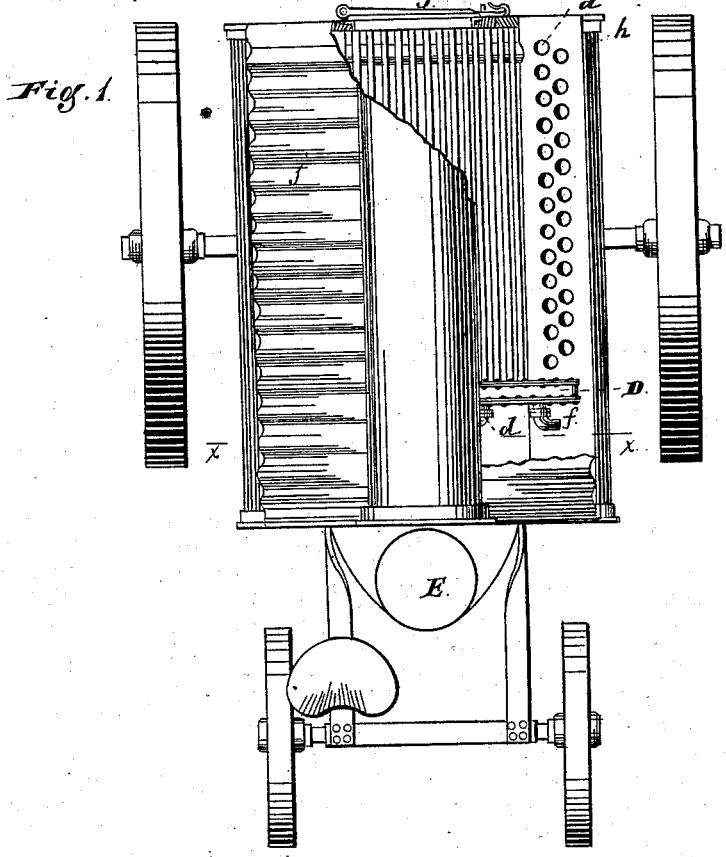
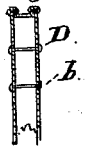
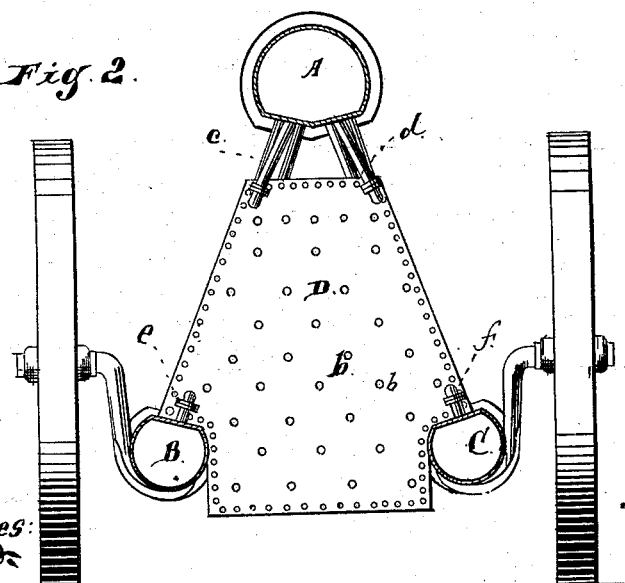
Witnesses:
Edgar S. Bond
Albert H. Adams
Inventor:
George C. Morgan

UNITED STATES PATENT OFFICE.

GEORGE C. MORGAN, OF CHICAGO, ILLINOIS.

BOILER.

SPECIFICATION forming part of Letters Patent No. 280,392, dated July 3, 1883.

Application filed March 6, 1883. (No model.)

*To all whom it may concern:*

Be it known that I, GEORGE C. MORGAN, residing at Chicago, in the county of Cook and State of Illinois, and a citizen of the United States, have invented a new and useful Improvement in Boilers, of which the following is a full description, reference being had to the accompanying drawings, in which—

Figure 1 is a top view. Fig. 2 is a vertical cross-section at line $x$ of Fig. 1. Fig. 3 is detail, being a section of the bridge-wall.

My improvement relates to that class of boilers in which there is a main water and steam drum and two mud-drums, with connecting-pipes between the steam-drum and the mud-drums; and my improvement consists in providing such a boiler with a hollow bridge-wall connected with the main water and steam drum and also with the two mud-drums by means of pipes, which both support the bridge-wall in place and furnish water-passages between the drums and bridge-wall, all as hereinafter fully described.

I have shown my improvement applied to a portable boiler; but it is not necessarily limited to that class.

In the drawings, A represents the main water and steam drum. B C are two other drums, the relative position of the three drums being shown in Fig. 2. The drum A is connected with each of the drums B C by a series of water-pipes, $a$, as usual.

D is the bridge-wall, which I make of sheet metal, and hollow, so as to receive water. Stay-bolts $b$ may be used.

$e$ $d$ are two strong tubes, one of each opening into and suitably secured to the bridge-wall D, while the other ends open into and are secured to the drum A. $e$ is another tube, one end of which opens into the bridge-wall and the other into the drum B. $f$ is another tube, similar to $e$, one end of which opens into the bridge-wall and the other into the drum C. These tubes or pipes $c$ $d$ $e$ $f$ are so connected with the bridge-wall D and the drums A B C that the pipes support the bridge-wall in place. The edges of the bridge-wall pass in between the water-pipes $a$, and this wall fits around drums B C and extends up to any suitable height, and is carried down at the rear of the fire-chamber as far as the construction of the furnace requires.

E is the smoke-pipe.

In Fig. 1 I have shown a covering, of tile, $h$, and corrugated iron, $j$, upon the sides of the boiler; but in Fig. 2 these parts have been omitted. Access can be had to the fire-chamber through the door $g$. A suitable grate and ash-pit are of course to be provided; but these as well as the other parts not above named need not be described. I thus provide this kind of a boiler with a hollow bridge-wall, into which water passes from the drums A B C through short connecting-pipes, which also serve the purpose of supporting the bridge-wall in place, the bridge-wall furnishing a boiler surface of considerable extent.

I am aware that hollow bridge-walls having communication with the boiler have heretofore been used, and I do not claim such a wall broadly; but What I do claim, and desire to secure by Letters Patent, is as follows:

In combination with the drums A B C and pipes $a$, the hollow bridge-wall D, supported in place and connected with the said drums by means of the tubes $c$ $d$ $e$ $f$, said tubes serving to support and hold the bridge-wall in place, and with pipes $a$, affording a circulation of water between the drums and bridge-wall, substantially as described.

GEORGE C. MORGAN.

Witnesses:
ALBERT H. ADAMS,
EDGAR T. BOND.